Sept. 17, 1946. L. C. HUCK Re 22,792
RIVETED STRUCTURE AND METHOD OF MAKING THE SAME
Original Filed Aug. 3, 1932
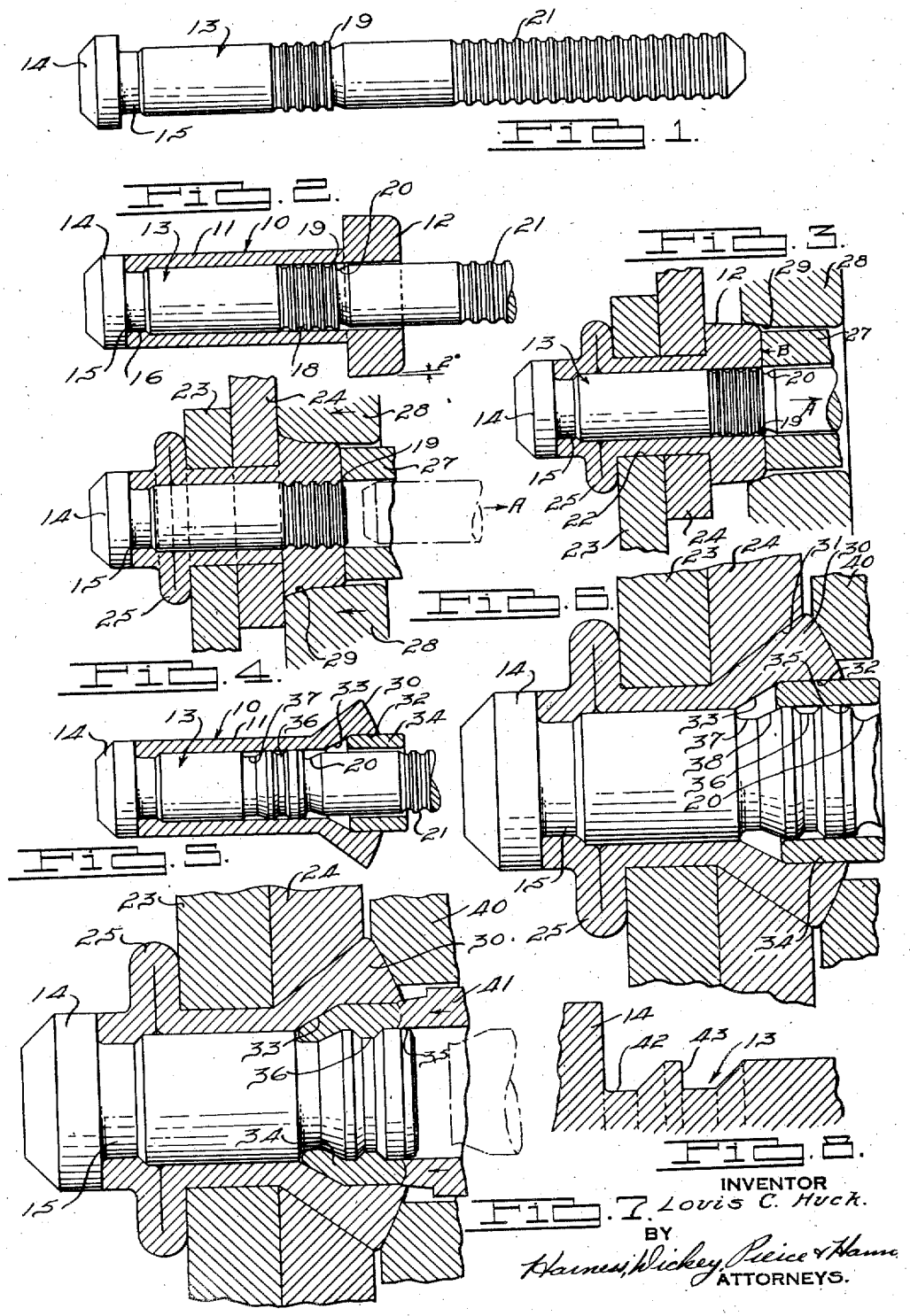
INVENTOR
Louis C. Huck.
BY
Haines, Dickey, Reice & Hamm
ATTORNEYS.

Reissued Sept. 17, 1946

Re. 22,792

UNITED STATES PATENT OFFICE 22,792

RIVETED STRUCTURE AND METHOD OF MAKING THE SAME

Louis C. Huck, Grosse Pointe, Mich., assignor to Huxon Holding Corporation, Detroit, Mich., a corporation of Michigan Original No. 2,061,628, dated November 24, 1936, Serial No. 627,343, August 3, 1932. Application for reissue April 2, 1945, Serial No. 586,243

43 Claims. (Cl. 218—19)

The invention relates to fastening devices and it has particular relation to a rivet and method of riveting structural elements.

In certain respects the invention constitutes an improvement over those embodied in my copending applications for patents relating to rivets, Serial Nos. 559,868 and 604,759, filed respectively, March 10, 1932, and April 8, 1932 the first of which was abandoned and the second of which issued as Patent No. 2,030,169 on February 4, 1936. In a rivet such as illustrated in either of the copending applications for patents identified, a tubular member is provided which may have a head at one end for engaging one side of the structure to be riveted, and a tubular body portion adapted to project through openings in the structure and beyond the opposite side thereof. The rivet illustrated also includes a pin projecting through the tubular member and beyond the outer side of the head thereon, and having a head engaging the end face of that part of the tubular member projecting beyond the opposite side of the structure. Intermediate its ends, the pin is provided with a break neck portion of undercut character. In setting a rivet of this type, the projecting end of the pin is gripped and pulled, while the reactionary force is applied against the head on the tubular member and during this operation, the head on the pin axially compresses the tubular member, and causes outward bulbing of the projecting portion thereof, into a bulbed head at that side of the structure opposite the first-mentioned head on the tubular member. Following the formation of this bulbed head, a continued pull on the pin and application of the reactionary force to the head on the tubular member, finally causes such tensioning of the pin, that it breaks at the undercut therein and preferably the undercut is so located, that after formation of the bulbed head by a movement of the pin, the break will occur adjacent the outer face of the first-mentioned head on the tubular member.

While rivets of this character have been found highly successful, and the method of riveting described, particularly efficient, it seems that the recoil effect on that part of the pin remaining in the rivet after breaking at the break neck, may in certain instances cause slight loosening of the rivet connection and resilient return of the deformed part of the tubular member. Considerable force is required in tensioning the pin sufficiently to break it, and it will be readily appreciated that upon breaking of the pin, there is a tendency for the remaining portion of the pin in the rivet to move in a reverse direction and this tendency may be supplemented by expansive characteristics of the metal in the bulbed head. It seems that if the effect of this recoil can be avoided following breaking of the pin, a tighter rivet connection may be obtained.

One object of the present invention is to provide a rivet of the above general character, in which the recoil effect following breaking of the pin, is largely, if not entirely, avoided.

Another object of the invention is to provide a rivet of the above designated character, wherein the pin is more effective for taking tension on the rivet connection.

Another object of the invention is to provide a method of riveting in connection with a rivet of the general character above designated, wherein steps are taken before breaking of the pin to avoid the recoil effect on the pin and resilient return of the deformed part of the tubular member, upon breaking of the pin.

Another object of the invention is to provide a method of riveting in connection with a rivet of the general type described, wherein steps are taken to avoid the resilient return of the deformed part of the tubular member, in the rivet as finally set.

Another object of the invention is to provide a method of riveting wherein prevention of the effect of this recoil force on the pin or the resilient return of the deformed part of the tubular member, may be effected in either a rivet having a head disposed in a counter-sunk opening in the structure being riveted, or in a rivet wherein the head is disposed outwardly of the structure.

Other objects of the invention will be apparent from the following description and claims hereinafter set forth.

For a better understanding of the invention reference may be had to the accompanying drawing forming a part of the specification, wherein:

Figure 1 is a view of a pin forming part of a rivet constructed according to one form of the invention;

Fig. 2 is a fragmentary view of the pin after it has been assembled with a tubular rivet member;

Fig. 3 is a cross-sectional view illustrating the rivet shown by Fig. 2, after the first phase of the riveting operation;

Fig. 4 is a similar view showing the rivet as finally set;

Fig. 5 is a view similar to Fig. 2, but illustrating a rivet constructed according to another form of the invention;

Fig. 6 is a cross-sectional view on a larger scale illustrating the first step in setting the rivet shown by Fig. 5;

Fig. 7 is a cross-sectional view on a larger scale similar to Fig. 6 and illustrating the next step in the riveting operation;

Fig. 8 is a fragmentary cross-sectional view of the pin, showing a modified form of groove arrangement adjacent the head on the pin.

Referring to Fig. 2, a tubular rivet member 10 is provided having a cylindrical body portion 11 and an enlarged head 12 at one end thereof, the outer surface of the latter being axially tapered, as for example, at an angle of 2° as shown. A pin 13 projects through the tubular member 10, and has a head 14 at one end thereof which engages the end face of the body portion 11 of the tubular member, and adjacent this head, the pin is provided with an annular groove 15 into which an end portion 16 of the tubular member projects. It is apparent that the end of the tubular member over the groove 15 of the pin, is of greater radial thickness than the remainder of the body portion, and accordingly, that such end of the tubular member is more resistant to outward expansion or bursting. The manner in which this end portion of the tubular member is locked in the groove 15 in the pin, is more particularly described and illustrated in my copending application, Serial No. 604,759, which has been previously mentioned.

Intermediate its ends and adjacent the head 12 on the tubular member, the pin 13 as seen in Fig. 2, has grooves or threads 18 which may be spirally directed and adjacent these grooves or threads, and at the side thereof opposite head 14, another and slightly deeper groove 20 is provided. The pin beginning with the groove 20, and at that side thereof opposite the threads or grooves 18, is slightly smaller in diameter for the purpose of facilitating assembly of the rivet parts. Between the groove 20 and grooves 18, a slight taper 19 may be formed on the pin, to avoid a sharp edge which would be apt to shear metal from the under surface of the tubular member during insertion of the pin thereinto. That part of the pin projecting from the head 12, is provided with grooves or threads 21 which may be spirally directed, to facilitate gripping of this portion of the pin by jaws of a rivet setting machine.

In using a rivet of this character, the assembly as seen in Fig. 2, may be inserted through openings 22 in structural elements 23 and 24 shown in Fig. 3, until the head 12 on the tubular member engages the outer side of the structural element 24. Then by gripping the grooved or threaded portion 21 of the pin and pulling it in the direction indicated by the letter A, and applying the reactionary force to the pull, against the head 12 of the tubular member as indicated by the letter B, the movement of the pin through the tubular member, and engagement of the head 14 with the end portion of the latter, will cause outward bulbing of the body portion of the tubular member between the structural element and the groove 15 in the pin, to provide a bulbed head indicated at 25 in Fig. 3. It might stated in this connection that the dimensions of the pin and body portion of the tubular member, and the materials of which they are constructed, are such that initially at least, that part of the tubular member in the opening 22 in the structure, is upset to fill in any clearance spaces either between the structure and tubular member and between the tubular member and the pin, to the end that the rivet connection when the bulbed head is formed, is very tight. Particular dimensions and materials that may be employed have already been set forth in an exemplary manner in my copending applications for patents above identified.

After the bulbed head 25 is formed, a continued pull on the pin will break it at the break neck or groove 20 which preferably is located after the bulbed head is formed, substantially at the outer face of the head 12 as shown particularly by Fig. 3. Owing to the great tension on the pin necessary to break it, however, there is a considerable recoil on that portion of the pin remaining in the tubular member following the break and in order to avoid the effect of this recoil, and resilient return of the deformed part of the tubular member, the grooves or threads 18 have been provided on the pin. These are effective for this purpose in that following formation of the head 25, the head 12 on the tubular member is radially contracted and upset into the threads or grooves 18, which are then located within the head, to lock the pin to the head, before breaking of the pin at the break neck 20. This result may be effected by initially applying the reactionary force through an anvil 27 engaging the end face of the head 12 adjacent to and around the pin, until the bulbed head 25 is formed and the plates 23 and 24 are tightly drawn together. This anvil it will be seen, directs the reactionary force substantially parallel to the axis of the rivet and hence does not effectively tend to upset the metal in the head 12 into the grooves or threads 18 in the pin.

After the head 25 is formed, and the grooves or threads 18 are within head 12, with the break neck 20 substantially at the outer face of the latter head, a second anvil 28 may be employed to contract the head 12, to upset a portion of the metal therein, into the grooves or threads. This anvil preferably has a leading face 29, directed at approximately 15° to the axis of the rivet, and a second face continuing rearwardly from face 29 and directed at an angle of approximately 2° to the axis, or substantially in accordance with the outer face of head 12 on the rivet. As this secondary anvil becomes effective, it moves over the head and the latter is contracted as shown by Fig. 4, and metal therein is upset into the grooves or threads 18. It should be understood that this contracting of the head occurs while the pin is under tension following formation of head 25, and that the secondary anvil may be actuated by the reactionary force to the pull on the pin. A rivet setting machine such as disclosed in the copending application for patent of Louis C. Huck and George T. Chapman, Serial No. 615,544, filed June 6, 1932, issued as Patent No. 2,053,718, September 8, 1936, might be used for this purpose by having anvils that may be threaded into the end of the barrel of the machine, in which event, the anvils 27 and 28 could be used alternately by removing one and threading the other into the end of the barrel in place thereof. The threads or grooves 21 on the pin and those on the jaws in said machine, may be spirally directed if desired to facilitate separating the machine from the pin after the first head is formed with anvil 27, after which the second anvil 28 may be substituted for anvil 27 and the machine again used for pulling the pin, in which case anvil 28, applying the reactionary force, will contract the head 12, before the pin breaks.

A machine for particularly setting a rivet of this character, or of the type shown by Fig. 5, forms the subject matter of an application for patent of Louis C. Huck, George T. Chapman, Will E. Morris and Ralph A. Miller, Serial No. 636,480, filed October 6, 1932, issued as Patent No. 2,053,719, September 18, 1936. In a machine of this character the reactionary force to the pull on the pin is changed from the inner to the outer anvil, after the head 25 is formed and the plates riveted are drawn tightly together, and before breaking of the pin. In this case, the metal in the head 12 is forced into the grooves or threads 18 while maintaining the pull on the pin.

During contracting of the head 12 in this manner, it also may axially be elongated to some extent, as seen in comparing Figs. 3 and 4, and this elongation may be desirable in that the elongation, with the pin locked to the head by the metal in grooves or threads 18, tends to further tighten the rivet connection and structure, by further tensioning that part of the pin in the tubular member.

In any event, after the metal is upset into the grooves or threads 18 in the pin as shown in Fig. 4, continued tension on the pin breaks it at the break neck 20. It is evident then that any recoil effect on the remainder of the pin in the rivet or resilient return of the deformed part of the tubular member is avoided, by the interlocking tongue and recess engagement between the head 12 and the pin, or in other words, by the metal in the grooves or threads 18, and movement of the pin in a reverse direction through the rivet is thereby avoided. Maintaining the pin in such position following breaking thereof, naturally maintains the head 25 tightly against the structure. It has been found in practice that this interlocking of the head with the pin following formation of the bulb, results in a tighter rivet connection and that it is harder to turn the plates 23 and 24 relative to each other after the rivet is set.

In the rivet construction shown by Fig. 5, the tubular member is provided with a beveled or so-called counter-sunk head 30 which, as best shown by Fig. 6, is adapted to fit into a counter-sunk opening 31 in the structural element 24. Around the pin, the head is provided with a cylindrical groove or counter-bore 32 larger in diameter than the pin, and inwardly of this groove, or bore, a tapered face 33 directed for example at an angle of 30° to the axis, is provided which tapers from the inner extent of the groove or bore, axially and inwardly toward the pin. Initially a ring 34 is provided in the groove or bore 32 and projects outwardly of the head 30 and preferably this ring is composed of material having physical characteristics similar to those of the material of which the tubular member is composed.

As shown best by Figs. 6 and 7 the pin 13 is provided intermediate its ends with the break neck 20, and adjacent thereto, with a tapered surface 35 to avoid a sharp edge, as mentioned in connection with the taper 19 in Fig. 2, and inwardly of this taper, a groove 36 is provided. Spaced from this groove and inwardly thereof, an axially longer groove 37 is provided, having its side wall 38 adjacent groove 36, tapered at an angle of approximately 20° to the axis of the rivet.

In setting a rivet of this character, it is inserted in openings in the plates with head 30 fitting in the opening 31, and then by gripping and pulling the pin and applying the reactionary force to head 30 through an outer anvil 40, the head 25 may be formed. When the head 25 is formed, the grooves 36 and 37 will be within head 30, with the tapered side 38 forming in conjunction with the tapered side 33 of the opening in the head, a wedge shape entry to the base of groove 37. Groove 36 then is located radially inwardly of the groove or bore 32 in the head. After the head 25 is thus formed, a second anvil shown by Fig. 7, may be employed and this anvil engages ring 34. The anvil face of this anvil is preferably concaved slightly to fit a convex end face on the ring, and the radial width of the face is slightly greater than the radial thickness of the ring, to prevent any flow of metal in the ring over the outer periphery of the anvil. This anvil may be substituted for anvil 40 similarly to the manner of using anvils 27 and 28 previously described and machines may be used as described. Then as the pin is pulled, the reactionary force is applied through anvil 41 to ring 34.

As the ring moves farther into head 30, it is forced along tapered surface 33, and between this surface and tapered surface 38 on the pin, and into groove 37 as shown by Fig. 7. The wedge shape entry between surfaces 33 and 38 is desirable as it compensates for slight variations in the relative positions of the pin and tubular member after the head 25 is formed. Further application of the reactionary force on the ring 34, causes the metal therein adjacent groove 36, to flow radially thereinto, as shown by Fig. 7. During these operations, the movement of ring 34 into head 30, naturally tightens or calks the head relative to the structure, as the force tends to expand the head in its countersunk opening. This also further tightens the rivet connection. Furthermore, movement of the metal in ring 34, increases the tension on the pin and tends to further tighten the rivet connection. During final movement of the ring and anvil the latter may actually dig into the head 30 around the bore 32.

Continued tension on the pin breaks it at the break neck 20, and then it becomes apparent that the ring 34, locked to the pin and tightly disposed in head 30 and against taper 33, effectively avoids the recoil effect on the pin following the break, and resilient return of the deformed part of the tubular member.

It may be found desirable in either of the rivets to have the head 14 on the pin polygonal in shape, and to have the locking grooves or threads spirally directed, or similar spirally directed threads or grooves in place of the grooves 36 and 37. Then after the rivet is set, the pin might be removed for any cause whatever by turning head 14 and threading the pin out of the tubular member. To facilitate this result, the locking of the tubular member in groove 15 in the pin adjacent head 14 might be avoided, and if reinforcement of this end of the tubular member were desirable, such portion of the member might be heat treated or strain hardened.

While the anvils have been illustrated as having annular engagement with the head or the collar, it is apparent that suitable interlocking of the pin and head may be obtained by upsetting or contracting the head or collar at circumferentially spaced points.

Fig. 8 shows a plurality of grooves 42 adjacent the head 14 on the pin instead of the single groove 15. These grooves have substantially radial faces 43, which act as abutments engaging the portion of the tubular member in the grooves. These radial faces supplement the face contact of the head 14 with the end of the tubular member, and increase the contact area between pin and tubular member, effective to bulb the latter.

From the above description it will be apparent that rivet constructions have been provided, insuring tighter rivets of the general type described, and particularly in the case where the pin is broken following formation of the bulbed head. The interlocking of the head on the tubular member with the pin at both ends, also enables the pin to more effectively take tension loads on the rivet connection as it is apparent that since the pin is strongly locked into the tubular member at both ends of the latter, any tension on the rivet connection may be absorbed both by the tubular member and the pin. It is also apparent that a novel method of riveting to obtain the aforementioned results, has been provided wherein a force is directed between the bulb forming operation and breaking of the pin, either directly on the head on the tubular member or on a ring seated in a groove therein, to upset metal into grooves in the pin to effect the interlocking engagement.

Although more than one form of the invention has been described and illustrated, it will be apparent to those skilled in the art that various modifications may be made without departing from the scope of the appended claims.

What is claimed is:

1. The method of riveting which comprises providing a tubular member for insertion through openings in a structure and projection beyond a side thereof, providing a pin for engaging the projected end of the tubular member and which is adapted to pass through the tubular member and beyond its other end, assembling the parts and inserting them in the structural openings, pulling the projecting end of the pin to form a head from the projecting part of the tubular member, and then continuing the pull to break the pin intermediate its ends, and locking the remainder of the pin and the tubular member adjacent the breaking point, prior to occurrence of the break.

2. The method of riveting which comprises providing a tubular member for insertion in openings in a structure to be riveted, providing a pin for engaging the projected end of the tubular member and which is adapted to pass through the tubular member and beyond its other end, assembling the parts and inserting them in the structural openings, pulling the projecting end of the pin to form a head from the projecting part of the tubular member, and then continuing the pull to break the pin, and locking the remainder of the pin and the tubular member adjacent the breaking point prior to breaking of the pin and subsequent to formation of the head.

3. The method of riveting which comprises providing a tubular member for projection through openings in a structure and beyond a side of the structure, providing a pin adapted to extend through the tubular member, inserting the assembled parts into the structural openings, axially compressing the tubular member to form a head out of its projected portion, and then upsetting one of the members adjacent the opposite end of the rivet to lock it to the other.

4. The method of riveting which comprises providing a tubular member for projection through openings in a structure and beyond a side of the structure, providing a pin adapted to extend through the tubular member, inserting the assembled parts into the structural openings, axially compressing the tubular member to form a head at one side of the structure, and locking the pin in the tubular member at the opposite end of the rivet by upsetting one member into a recess in the other.

5. The method of riveting which comprises providing a tubular member for projection through openings in a structure and beyond a side of the structure, providing a pin adapted to extend through the tubular member, inserting the assembled parts into the structural openings, axially compressing the tubular member to form a head at one side of the structure, and locking the pin in the tubular member at the opposite end of the rivet by radially contracting the tubular member about the pin.

6. The method of riveting which comprises providing a tubular member for projection through openings in a structure and beyond a side of the structure providing a pin adapted to extend through the tubular member, inserting the assembled parts into the structural openings, axially compressing the tubular member to form a head at one side of the structure, and locking the pin in the tubular member at the opposite end of the rivet by upsetting means on one member into a recess in the other.

7. The method of riveting which comprises providing a tubular member for projection through openings in a structure and beyond a side of the structure, providing a pin adapted to extend through the tubular member, inserting the assembled parts into the structural openings, axially compressing the tubular member to form a head at one side of the structure, and locking the pin in the tubular member at the opposite end of the rivet by upsetting a loose collar on the pin, into a recess therein.

8. The method of riveting which comprises providing a tubular member, inserting a pin into the member, locking the pin to one end of the tubular member so that upon pulling the pin towards the other end of the member the locked end of the tubular member will move therewith, pulling the pin in the direction stated while applying the reactionary force to the opposite end of the tubular member to form a head from a portion of the tubular member, locking the pin to the tubular member at a point longitudinally spaced from the first lock while the pin is under tension, and then breaking the pin by increased tension, at a point adjacent the second lock.

9. The method of riveting which comprises providing a tubular member, inserting a pin in the tubular member, bulbing an annular body portion of the tubular member into a head by tensioning the pin, breaking the pin intermediate its ends, and locking the pin to the tubular member between the head forming and pin breaking operations.

10. The method of riveting which comprises providing a tubular member for projection through a structure, inserting a pin in the member for engagement with one end of the member, pulling the opposite end of the pin and applying the reactionary force to the adjacent end of the tubular member, to upset a portion of the tubular member into a head, and changing the locus of reactionary force application against the tubular member during the riveting operation.

11. The method of riveting which comprises providing a tubular member, inserting a pin in the member, locking the pin and member at one end for movement together in one direction, pulling the other end of the pin while applying the reactionary force to the adjacent end of the tubular member to cause formation of a head out of a body portion of the tubular member, and then locking the last mentioned end of the pin to the tubular member along a surface part of the pin within the tubular member.

12. The method of riveting which comprises providing a tubular member, inserting a pin in the member, locking the pin and member at one end for movement together in one direction, pulling the other end of the pin while applying the reactionary force to the adjacent end of the tubular member to cause formation of a head out of a body portion of the tubular member, and then locking the last mentioned end of the pin to the tubular member along a surface part of the pin within the tubular member, said locking being effected while the pin is under tension.

13. The method of riveting which comprises providing a tubular member, inserting a pin into the member, locking the pin and member at one end for movement together in one direction, inserting the assembly in a structure, pulling the other end of the pin while applying the reactionary force to the adjacent end of the tubular member, to cause formation of a head from a body portion of the tubular member and then upsetting metal in the last end portion of the tubular member into surface recesses in the adjacent end of the pin to further tighten the rivet connection.

14. The method of riveting which comprises providing a tubular member, inserting a pin into the member, locking the pin and member at one end for movement together in one direction, inserting the assembly in a structure, pulling the other end of the pin while applying the reactionary force to the adjacent end of the tubular member, to cause formation of a head from a body portion of the tubular member and then upsetting metal in the last end portion of the tubular member into surface recesses in the adjacent end of the pin to further tighten the rivet connection and to increase the tension on the pin.

15. The combination with a structure, a tubular member projecting through openings therein, heads on said member at opposite sides of the structure, one of which is of bulbed character, a pin projecting through the member, and means including interlocking tongues and recesses for locking the pin to opposite end portions of the tubular member.

16. The combination with a structure, a tubular member projecting through openings in the structure, and having a head at one side of such structure and a bulbed head at the opposite side of the structure, a pin projecting through the tubular member, means locking the pin to the member adjacent the first head against movement through the tubular member toward the opposite side of the structure, and means including an interlocking tongue and recess for locking the pin to the tubular member in longitudinally spaced relation to the first locking means.

17. The combination with a structure, a tubular member projecting through openings in the structure and having a head at one side of such structure, and a countersunk head at the opposite side of the structure seated in a countersunk opening in the latter, a pin projecting through the tubular member, means locking the pin to the member adjacent the first head against movement through the tubular member toward the opposite side of the structure, and means including an interlocking tongue and recess for locking the pin to the tubular member in longitudinally spaced relation to the first head.

18. The combination with a structure, a tubular member projecting through openings in the structure, and having heads at opposite sides of the structure, a pin projecting through the tubular member and engaging one head, and means including a radially upset portion of the other head fitting into a recess in the pin, for locking the other end of the pin to the tubular member.

19. In combination, a structure, a tubular member projecting through the structure and having a head bulbed from an annular wall portion thereof engaging one side of the structure and a head at the opposite side of the structure, a pin passing through the tubular member, and means positively locking both ends of the pin to the tubular member.

20. The method of riveting which comprises providing a tubular member, inserting a pin into the member, locking the pin and member at one end for movement together in one direction, inserting the assembly in a structure, pulling the other end of the pin while applying the reactionary force to the adjacent end of the tubular member to cause formation of a head from a body portion of the tubular member and then upsetting metal in the last end portion of the tubular member into surface recesses in the adjacent end of the pin to further tighten the rivet connection with the tubular member under tension.

21. The method of riveting which comprises providing a tubular member for projection through openings in a structure and beyond a side of the structure, providing a pin adapted to extend through the tubular member, inserting the assembled parts into the structural openings, axially compressing the tubular member to form an annular, bulbed head out of its projected portion, and then upsetting one of the members adjacent the opposite end of the rivet to lock it to the other.

22. The method of riveting which comprises providing a tubular member for projection through openings in a structure and beyond a side of the structure, providing a pin adapted to extend through the tubular member, inserting the assembled parts into the structural openings, axially compressing the tubular member to form an annular, bulbed head at one side of the structure, and locking the pin in the tubular member at the opposite end of the rivet by radially contracting the tubular member about the pin.

23. The method of riveting which comprises providing a tubular member for projection through openings in a structure and beyond a side of the structure, providing a pin adapted to extend through the tubular member, inserting the assembled parts into the structural openings, axially compressing the tubular member to form an annular, bulbed head at one side of the structure, and locking the pin in the tubular member at the opposite end of the rivet by upsetting metal operatively connected to one member into a recess in the other.

24. The method of riveting which comprises providing a tubular member adapted to be inserted through openings in a structure to be riveted and having a portion adapted to project from one side of the structure, inserting a pin in the member which engages the free end of said portion and projects beyond the other end of the tubular member, pulling the latter projecting end of the pin and applying the reactionary force to the adjacent end of the tubular member so as to cause formation of a head from said tubular portion projecting from the structure, interlocking the pin and tubular member at the end of the latter opposite the head so as to provide an abutment preventing reverse movement of the pin, and then increasing the tension on the pin to break it at a weaker point so located that the break occurs outwardly of the abutment.

25. The method of riveting which comprises providing a tubular member adapted to be inserted through openings in a structure to be riveted and having a portion adapted to project from one side of the structure, inserting a pin in the member which engages the free end of said portion and projects beyond the other end of the tubular member, pulling the latter projecting end of the pin and applying the reactionary force to the adjacent end of the tubular member so as to cause formation of an annular bulbed head from said tubular portion projecting from the structure, interlocking the pin and tubular member at the end of the latter opposite the head so as to provide an abutment preventing reverse movement of the pin, and then increasing the tension on the pin to break it at a weaker point so located that the break occurs outwardly of the abutment.

26. In combination, a structure having openings, a tubular member projecting through such openings and having an annular head bulbed from the annular wall portion of the tubular member at one side of the structure, a head on the tubular member engaging the opposite side of the structure, a pin passing through the tubular member, means on the pin operatively engaging the outer side of the bulbed head, said pin having a surface recess located within the other head on the tubular member, and means in said recess and operatively connected to the tubular member for preventing inward movement of the pin relative to said other head.

27. In combination, a structure having openings, a tubular member projecting through such openings and having an annular head bulbed from the annular wall portion of the tubular member at one side of the structure, a head on the tubular member engaging the opposite side of the structure, a pin passing through the tubular member, means on the pin operatively engaging the outer side of the bulbed head, said pin having a surface recess located within the other head on the tubular member, and means in said recess and operatively connected to the tubular member for preventing inward movement of the pin relative to said other head, said last mentioned means comprising portions of the last mentioned head on the tubular member which are upset into the recess.

28. The method of riveting which comprises providing a tubular member having a head on one end adapted to engage one side of a structure to be riveted, a portion to be disposed in openings in the structure, and a portion at the other side of the structure adapted to be bulbed into an annular head, providing a pin in the tubular member having a head for applying axial forces to the free end of the portion of the tubular member to be bulbed and having a portion projecting beyond the opposite end of the tubular member to enable pulling the pin, providing a recess in the surface of the pin and a weaker section adjacent said recess, pulling said projecting end of the pin and applying the reactionary force to the head on the tubular member so as to cause the pin to move and said portion of the tubular member to be bulbed into an annular head, operatively locking the other end of the tubular member to the pin by upsetting metal into said recess, and then increasing the tension on the pin to break it at said weaker section, said recess being located inwardly of the weaker section so as to remain in the rivet connection after the pin is broken.

29. The method of riveting which comprises providing a tubular member having a head on one end adapted to engage one side of a structure to be riveted, a portion to be disposed in openings in the structure, and a portion at the other side of the structure adapted to be bulbed into an annular head, providing a pin in the tubular member having a head for applying axial forces to the free end of the portion of the tubular member to be bulbed and having a portion projecting beyond the opposite end of the tubular member to enable pulling the pin, providing a recess in the surface of the pin and a weaker section adjacent said recess, pulling said projecting end of the pin and applying the reactionary force to the head on the tubular member so as to cause the pin to move and said portion of the tubular member to be bulbed into an annular head, operatively locking the first mentioned head of the tubular member to the pin by upsetting metal in said head into said recess, and then increasing the tension on the pin to break it at said weaker section, said recess being located inwardly of the weaker section so as to remain in the rivet connection after the pin is broken.

30. The method of riveting a structure, wherein the rivet comprises a tubular member and a pin in the tubular member having means at one end for applying axial forces to one end of the tubular member, inserting the assembly in openings in the structure, forming a head on said end of the tubular member at one side of the structure by moving the pin through the tubular member towards the opposite side of the structure while applying the reactionary force to the tubular member at said opposite side of the structure, and then employing the reactionary force to lock the pin and tubular member directly together at said opposite side of the structure while maintaining a pull on the pin.

31. The method of riveting a structure, wherein the rivet comprises a tubular member and a pin in the tubular member having means at one end for applying axial forces to one end of the tubular member, inserting the assembly in openings in the structure, forming a head on said end of the tubular member at one side of the structure by moving the pin through the tubular member towards the opposite side of the structure while applying the reactionary force to the tubular member at said opposite side of the structure, and then employing the reactionary force to swage the end of the tubular member at said opposite side of the structure into locking engagement with the pin.

32. The method of riveting a structure, wherein the rivet comprises a tubular member and a pin in the tubular member having means at one end for applying axial forces to one end of the tubular member, inserting the assembly in openings in the structure, forming a head on said end of the tubular member at one side of the structure by moving the pin through the tubular member towards the opposite side of the structure while applying the reactionary force to the tubular member at said opposite side of the structure, and then employing the reactionary force to swage the end of the tubular member at said opposite side of the structure into locking engagement with the pin while maintaining the pin under tension.

33. The method of riveting a structure, wherein the rivet comprises a tubular member and a pin in the tubular member having means at one end for applying axial forces to one end of the tubular member, inserting the assembly in openings in the structure, forming a head on said end of the tubular member at one side of the structure by moving the pin through the tubular member towards the opposite side of the structure while applying the reactionary force to the tubular member at said opposite side of the structure, and then employing the reactionary force to lock the pin and tubular member directly together at said opposite side of the structure while maintaining a pull on the pin and then breaking the pin under tension outwardly of said lock.

34. The method of riveting a structure, wherein the rivet comprises a tubular member and a pin in the tubular member having means at one end for applying axial forces to one end of the tubular member, inserting the assembly in openings in the structure, forming a head on said end of the tubular member at one side of the structure by moving the pin through the tubular member towards the opposite side of the structure while applying the reactionary force to the tubular member at said opposite side of the structure, and then employing the reactionary force to swage the end of the tubular member at said opposite side of the structure into locking engagement with the pin and then breaking the pin under tension outwardly of said lock.

35. A method of riveting wherein the rivet comprises a tubular rivet member having a head at one end and a portion at its other end adapted to be expanded into a head, and a pin extending through the tubular member and having means for applying forces to said tubular member to expand it, which comprises moving the pin through the tubular member to cause expansion of said tubular portion into a head, and thereafter contracting metal in the first head into interlocking engagement with the pin.

36. A method of riveting wherein the rivet comprises a tubular rivet member having a head at one end and a portion at its other end adapted to be expanded into a head, and a pin extending through the tubular member and having means for applying forces to said tubular member to expand it, which comprises pulling the pin through the tubular member in a direction to effect said expansion, applying the reactionary force to hold the head and the tubular member while the pin is pulled, and employing said reactionary force after such expansion to cause a movement of metal into locking recesses in the pin while maintaining the latter under tension.

37. A method of riveting wherein the rivet comprises a tubular member having a head at one side for engaging one side of a structure and a portion at its other end adapted to provide a head at the other side of the structure, and a pin extending through the tubular member and beyond the first head to provide a gripping portion and having means for engaging said tubular portion, which comprises pulling the gripping portion of the pin and applying the reactionary force to said head, and at a predetermined time reducing the size of said first head by a metal drawing operation so as to contract it into tight engagement with the pin.

38. The method of setting and locking a rivet or the like in a structure having an opening receiving the rivet wherein the rivet comprises a pin extending through the opening, means on one end of the pin at one side of the structure adapted to provide an abutment for preventing movement of the pin completely through the structure when the opposite end of the pin is pulled, and a tubular head element on the pin at the opposite side of the structure and from which the end of the pin to be pulled projects, which comprises pulling the projecting end of the pin and applying the reaction force against the tubular head element, and then causing anvil means to be drawn or moved over the head element to radially contract it into locking engagement with the pin while the pin is under tension.

39. The method of setting and locking a rivet or the like in a structure having an opening receiving the rivet wherein the rivet comprises a pin extending through the opening, means on one end of the pin at one side of the structure adapted to provide an abutment for preventing movement of the pin completely through the structure when the opposite end of the pin is pulled, and a tubular head element on the pin at the opposite side of the structure and from which the end of the pin to be pulled projects, which comprises pulling the projecting end of the pin and applying the reaction force against the tubular head element, then causing anvil means to be drawn or moved over the head element to radially contract it into binding engagement with the pin while the pin is under tension, and then breaking the pin under tension adjacent to but axially outwardly of the binding engagement.

40. The method of setting and locking a rivet or the like in a structure having an opening receiving the rivet wherein the rivet comprises a pin extending through the opening, means on one end of the pin at one side of the structure adapted to provide an abutment for preventing movement of the pin completely through the structure when the opposite end of the pin is pulled, and a tubular head element on the pin at the opposite side of the structure and from which the end of the pin to be pulled projects, which comprises pulling the projecting end of the pin and applying the reaction force against the tubular head element, and then radially upsetting metal on one element into locking engagement with the other while maintaining the pin under tension.

41. The method of setting and locking a rivet or the like in a structure having an opening receiving the rivet wherein the rivet comprises a pin extending through the opening, means on one end of the pin at one side of the structure adapted to provide an abutment for preventing movement of the pin completely through the structure when the opposite end of the pin is pulled, and a tubular head element on the pin at the opposite side of the structure and from which the end of the pin to be pulled projects, which comprises pulling the projecting end of the pin and applying the reaction force against the tubular head element, and then radially contracting the head element into locking engagement with the pin while the pin is under tension.

42. The method of setting and locking a rivet or the like in a structure having an opening receiving the rivet wherein the rivet comprises a pin extending through the opening, means on one end of the pin at one side of the structure adapted to provide an abutment for preventing movement of the pin completely through the structure when the opposite end of the pin is pulled, and a tubular head element on the pin at the opposite side of the structure and from which the end of the pin to be pulled projects, which comprises pulling the projecting end of the pin and applying the reaction force against the tubular head element, and then using the reaction force to radially contract the head into locking engagement with the pin while holding the pin under tension.

43. The method of setting and locking a rivet wherein the rivet includes a tubular element having a first head at one end for engaging one side of a structure to be riveted and a portion at its other end adapted to be expanded to form a head at the other side of the structure, and a pin extending through the tubular member and beyond the first head to provide a gripping portion and having means for engaging the tubular portion to expand it when the pin is moved, which comprises pulling the gripping portion of the pin and applying the reaction force to said first head until the expanded head is formed, and then locking the first head to the pin by radially upsetting metal in one of such parts into locking engagement with the other while maintaining the pin under tension.

LOUIS C. HUCK.